(12) United States Patent
Van Velzen et al.

(10) Patent No.: US 9,959,103 B2
(45) Date of Patent: May 1, 2018

(54) CODE DEPLOYMENT ASSISTANCE

(75) Inventors: Danny Van Velzen, Redmond, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1020 days.

(21) Appl. No.: 12/950,810

(22) Filed: Nov. 19, 2010

(65) Prior Publication Data

US 2012/0131546 A1 May 24, 2012

(51) Int. Cl.
*G06F 9/44* (2006.01)
*G06F 9/445* (2006.01)

(52) U.S. Cl.
CPC ............. *G06F 8/60* (2013.01); *G06F 8/20* (2013.01); *G06F 8/30* (2013.01); *G06F 8/36* (2013.01)

(58) Field of Classification Search
CPC ..... G06F 8/20; G06F 8/65; G06F 8/36; G06F 8/60; G06F 8/61; G06F 8/30
See application file for complete search history.

(56) References Cited

U.S. PATENT DOCUMENTS

| | | | |
|---|---|---|---|
| 7,010,779 B2 * | 3/2006 | Rubin ................ G06F 8/30 715/212 |
| 7,136,857 B2 | 11/2006 | Chen et al. |
| 7,610,293 B2 | 10/2009 | Vedula |
| 7,930,273 B1 * | 4/2011 | Clark et al. .................. 717/170 |
| 8,020,144 B2 * | 9/2011 | Yang ........................ G06F 8/20 717/106 |
| 8,396,845 B2 * | 3/2013 | Bahat ................ G06F 17/30997 707/694 |
| 8,645,944 B2 * | 2/2014 | Mechelke ......... G06F 17/30893 717/174 |
| 2003/0188036 A1 | 10/2003 | Chen et al. |
| 2004/0064804 A1 * | 4/2004 | Daniels et al. ............... 717/106 |
| 2004/0261065 A1 * | 12/2004 | Abrams et al. ............... 717/140 |
| 2005/0050071 A1 * | 3/2005 | Debrunner ..................... 707/100 |
| 2006/0036993 A1 | 2/2006 | Buehler et al. |
| 2007/0214111 A1 * | 9/2007 | Jin et al. ............................ 707/3 |

(Continued)

FOREIGN PATENT DOCUMENTS

| | | |
|---|---|---|
| CN | 1731738 A | 2/2006 |
| CN | 101320336 A | 12/2008 |

(Continued)

OTHER PUBLICATIONS

Klein et al., "Model-Driven Engineering: Automatic Code Generation and Beyond", Mar. 2015, Carnegie Mellon University, pp. 1-36; <https://resources.sei.cmu.edu/asset_files/TechnicalNote/2015_004_001_435420.pdf>.*

(Continued)

*Primary Examiner* — Thuy Dao
*Assistant Examiner* — Ben C Wang
(74) *Attorney, Agent, or Firm* — David W. Grillo, LLC

(57) ABSTRACT

Computer programming is aided by way of automatic code generation, and more specifically generation of deployment code automatically. An application can be analyzed and deployment code, including installation, maintenance (e.g., update/upgrade), and removal (e.g., un-install) code, can be generated as a function of the analysis as well as a particular execution environment.

20 Claims, 12 Drawing Sheets

(56) References Cited

U.S. PATENT DOCUMENTS

| | | | |
|---|---|---|---|
| 2007/0250574 A1* | 10/2007 | Tseitlin | G06Q 10/06 709/205 |
| 2007/0288904 A1* | 12/2007 | Newcomb | 717/126 |
| 2008/0196025 A1 | 8/2008 | Meijer et al. | |
| 2008/0320109 A1* | 12/2008 | Andrews et al. | 709/220 |
| 2009/0006409 A1* | 1/2009 | Yang | G06F 8/20 |
| 2009/0019436 A1* | 1/2009 | Hartz et al. | 717/178 |
| 2009/0199159 A1 | 8/2009 | Meijer et al. | |
| 2009/0204583 A1* | 8/2009 | Hechler et al. | 707/3 |
| 2009/0249310 A1 | 10/2009 | Meijer et al. | |
| 2009/0249489 A1* | 10/2009 | Livshits et al. | 726/26 |
| 2009/0265719 A1* | 10/2009 | Meijer et al. | 719/320 |
| 2009/0292791 A1* | 11/2009 | Livshits et al. | 709/217 |
| 2009/0327220 A1 | 12/2009 | Meijer et al. | |
| 2010/0042604 A1* | 2/2010 | Mechelke | G06F 8/61 717/172 |
| 2010/0083285 A1* | 4/2010 | Bahat | G06F 17/30997 719/328 |
| 2010/0088283 A1* | 4/2010 | Ahmed | G06F 17/30312 707/665 |
| 2011/0154314 A1* | 6/2011 | Balasubramanian | G06F 8/65 717/171 |
| 2012/0117532 A1* | 5/2012 | Knepper | G06F 8/61 717/101 |
| 2012/0159469 A1* | 6/2012 | Laor | 717/173 |
| 2012/0284288 A1* | 11/2012 | Bickle | G06F 8/423 707/755 |
| 2012/0317564 A1* | 12/2012 | Lee | 717/175 |
| 2012/0324435 A1* | 12/2012 | Somani | G06F 8/30 717/170 |
| 2013/0151975 A1* | 6/2013 | Shadi et al. | 715/734 |
| 2014/0034721 A1* | 2/2014 | Gadepalli | G06F 8/71 235/375 |
| 2015/0199088 A1* | 7/2015 | Chandaria | G06F 3/0482 715/763 |
| 2015/0286362 A1* | 10/2015 | Chandaria | G06F 3/0484 715/771 |
| 2016/0139910 A1* | 5/2016 | Ramanathan | G06F 8/65 717/170 |
| 2017/0046143 A1* | 2/2017 | Kochhar | G06F 8/60 |
| 2017/0068525 A1* | 3/2017 | Johnston | G06F 8/60 |
| 2017/0180205 A1* | 6/2017 | Baset | H04L 41/0869 |
| 2017/0255542 A1* | 9/2017 | Potti | G06F 11/3604 |

FOREIGN PATENT DOCUMENTS

| | | |
|---|---|---|
| CN | 101382886 A | 3/2009 |
| CN | 101739254 A | 6/2010 |

OTHER PUBLICATIONS

Galilleo et al., "HighFrame: An integrated solution for developing component-based distributed systems", ACM, EATIS'14, Apr. 2014, pp. 1-6; <https://dl.acm.org/citation.cfm?id=2590666&CFID=1010142667&CFTOKEN=63671704>.*

Klee et al., "Acceptance-based Software Architecture Deployment for Improvement of Existing Applications", IEEE, Jan. 2016, pp. 1832-1837; <http://ieeexplore.ieee.org/stamp/stamp.jsp?tp=&arnumber=7376832>.*

"Sun Open Net Environment (Sun ONE) Application Server 7 Performance", Retrieved at <<http://www.oracle.com/technetwork/java/s1as7-perfwpr1b-149983.pdf>>, A Technical White Paper, pp. 34. Author: Unknown. Retrieved: Jan. 25, 2013.

"Office Action and Search Report Issued in Chinese Patent Application No. 201110386147.5", dated Feb. 20, 2014, 12 Pages.

"Office Action Issued in Chinese Patent Application No. 201110386147.5", dated Oct. 24, 2014, 12 Pages.

"Third Office Action and Search Report Issued in Chinese Patent Application No. 201110386147.5", dated Apr. 22, 2015, 12 Pages.

"Fourth Office Action and Search Report Issued in Chinese Patent Application No. 201110386147.5", dated Nov. 2, 2015, 12 Pages.

"Fifth Office Action and Search Report Issued in Chinese Patent Application No. 201110386147.5", dated May 7, 2016, 12 Pages.

"Sixth Office Action Issued in Chinese Patent Application No. 201110386147.5", dated Feb. 4, 2017, 7 Pages.

"Office Action Issued in Chinese Patent Application No. 201110386147.5", dated Jul. 12, 2017, 7 Pages.

* cited by examiner

CODE DEPLOYMENT ASSISTANCE

BACKGROUND

Distributed computing refers to computer processing in which different parts of a program or application are run concurrently on two or more autonomous computers that communicate over a network such as the Internet. These computers interact with each other to achieve a common goal. Work is distributed amongst a number of computers often to accomplish a task that is impossible with the processing power of a single or particular computer. Alternatively, work can be distributed across multiple computers simply to expedite processing.

Various network architectures, models, or the like can be employed to communicatively couple numerous computers and enable distributed computing. One of the most well-known architectures is the client-server or two-tier architecture. Here, work is partitioned between servers that act as content or service providers and clients that request content or services provided thereby. Some specific server types include, without limitation, web, application, database, mail, file, and printer servers. Exemplary client types include web browsers and e-mail clients, among others. Other multi-tier architectures are also conventionally employed such as a three-tier architecture that includes a presentation, application (a.k.a. business logic, logic, middle), and data tiers, which separates presentation, application functionality, and data storage and access, respectively. By contrast, a single-tier architecture includes presentation, application, and data in a single location.

Unfortunately, developing distributed applications is a very onerous process. In particular, dissimilar environments need to be taken into account on which portions of a program will execute. For instance, computers likely will have different file systems, operating systems, and hardware components. Further yet, programmers need to have more than a casual understanding of numerous distributed programming technologies (e.g., HyperText Markup Language (HTML), JavaScript, Extended Markup Language (XML), Structured Query Language (SQL), Simple Object Access Protocol (SOAP) . . . ). Still further yet, programmers need to make decisions upfront as to how programs will be partitioned across two or more tiers and are forced to focus on asynchronous callbacks and other time-consuming distributed programming issues, which may prematurely fixate distribution boundaries and negatively affect development of rich and broad reaching distributed applications.

Tier splitting technology exists to reduce the burden of distributed programming. More specifically, an application can be specified with respect to a single tier that can subsequently be split into multiple tiers supporting distributed execution across the tiers.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to code deployment assistance. In some situations, deployment of code is overwhelmingly burdensome. For instance, where a first execution engine is hosted by a second execution engine, the second execution engine or environment can prescribe a very particular protocol to deploy an application with respect to the first, or guest, execution engine or environment. For example, each piece of code (e.g., method, data type . . . ) and dependent pieces of code may need to be registered with the host execution environment in a particular order.

A deployment component and associated functionality can be employed to generate deployment code automatically to alleviate programmer burden. More specifically, the application can be analyzed and information ascertained that can be helpful in deployment of the application including dependency information, among other things. Based at least in part on the information acquired from the application code itself, deployment code including installation, maintenance (e.g., update/upgrade), and removal (e.g., uninstall) code can be generated automatically for a particular execution engine.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward facilitating application code deployment. In some situations, application code deployment can simply involve copying the application code to a particular location on a computer. In other situations, however, deployment can be overwhelmingly burdensome. For instance, given a host execution environment and a guest execution environment, the host execution environment can mandate use of particular deployment protocol for safety and/or security reasons. By way of example, and not limitation, database servers, or the like can allow code to run to speed up execution, and include particular protocols for code registration. Similar protocols can be enforced with respect to maintaining (e.g., update, upgrade, versioning . . . ) and un-installing the application code. To alleviate this burden, mechanisms can be put in place to analyze application code and generate installation, maintenance, and/or removal code automatically based at least in part on results of the analysis. In accordance with one embodiment, such mechanisms can be employed in combination with tier splitting technology.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
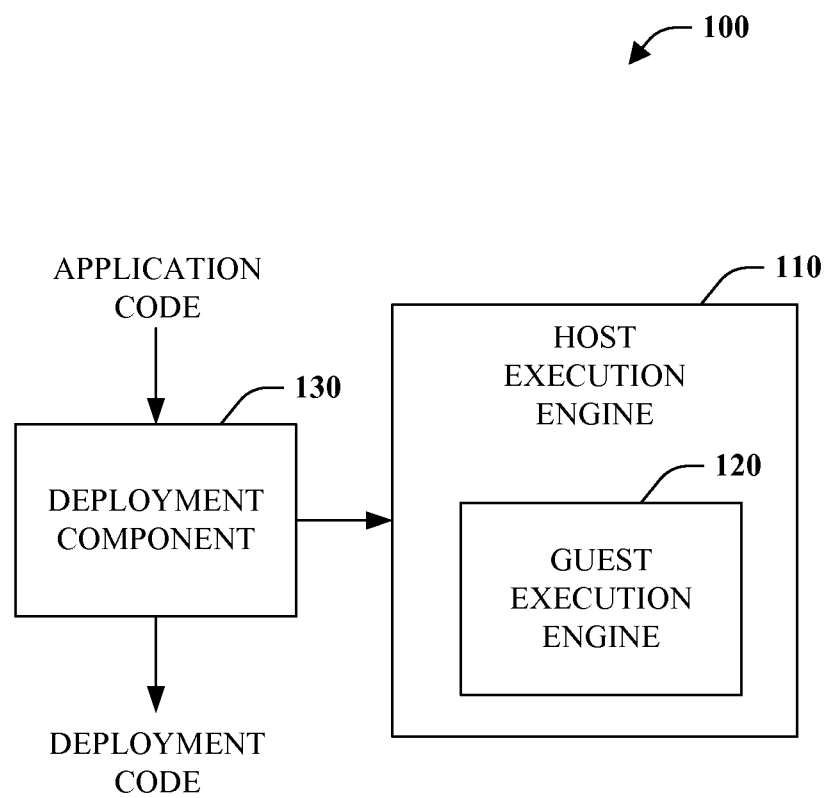
FIG. 1 is a block diagram of a system that facilitates application deployment.

Referring initially to FIG. 1, a system 100 that facilitates application code deployment, among other things, is illustrated. The system 100 includes a host execution engine 110 including a guest execution engine 120. Stated differently, the host execution engine 110 defines a first execution environment that hosts the guest execution engine 120 that defines a second execution environment. The relationship between the host execution engine 110 and the guest execution engine 120 can result in possible safety or security issues. For example, an application executed by the guest execution engine can potentially, negatively impact the host execution engine 110 and/or code executed thereby. Accordingly, the host execution engine 110 can impose particular protocols with respect to deploying and otherwise interacting with an application targeting the guest execution engine 120. These protocols can be designed to mitigate potential safety and/or security risks and can be burdensome to programmers. Moreover, the extent of the burden can vary as a function of the complexity of the protocol, which can vary based on degree of trust between the host execution engine 110 and the guest execution engine 120. In some situations, the burden is overwhelming such that programmers simply avoid utilizing particular technology.

The system 100 also includes a deployment component 130 communicatively coupled to the host execution engine 110 and indirectly to guest execution engine 120. The deployment component 130 can alleviate much, if not all, the burden associated with deploying a computer application (e.g., user code specifying one or more particular tasks executable by a processor-based device) that targets the guest execution engine 120 vis-à-vis the host execution engine 110. More specifically, the deployment component 130 can generate code executable by the host execution engine 110 to deploy the application or portion thereof with respect to the guest execution engine 120, among other things. In accordance with one embodiment, the deployment component 130 can generate the deployment code and provide it to the host execution engine 110 for execution. In another embodiment, the deployment code can be output for inspection, for example by an authorized entity such as an administrator, and if deemed acceptable the authorized entity can initiate execution with respect to the host execution engine 110.

In accordance with one non-limiting embodiment, the host execution engine 110 and guest execution engine 120 can reside in a data tier (e.g., database, database server . . . ). For example, the host execution engine 110 can be relational (e.g., SQL (Structured Query Language) processor) and the guest execution engine 120 can support execution of code specified with respect to one or more general-purpose programming languages (e.g., object-oriented, procedural, functional . . . hybrid) (e.g., SQL-CLR (Structured Query Language-Common Language Runtime)). In this case, the host execution engine 110 can require an application be registered in a convoluted manner prior to execution. For instance, a protocol can mandate registration of application pieces (e.g., methods, functions . . . ) as well as a chain of dependent application pieces in a particular order. By way of example, the protocol could require: 1) copying of code; 2) registering the code; 3) registering a data type; 4) registering a first method; 5) registering a second method, and so on. This is overwhelmingly burdensome on programmers, so much so that programmers often choose to avoid systems, environments, architectures, or the like that deploy in this manner. The deployment component 130 can remove much, if not all, of this burden from programmers and as such encourage utilization of systems, environments, architectures, or the like with onerous deployment protocols including database systems that allow code to run to expedite execution.

Figure 2:
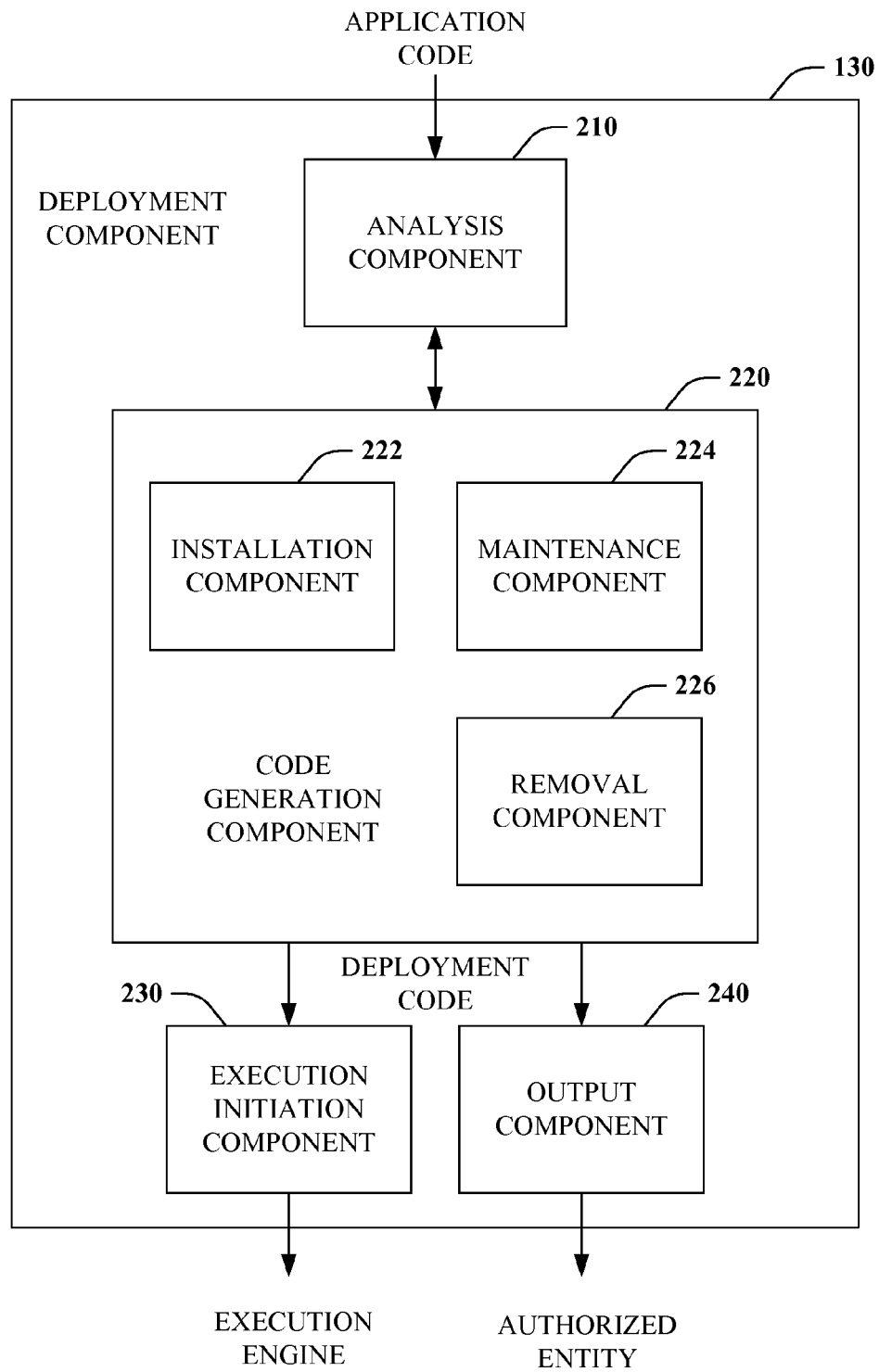
FIG. 2 is a block diagram of a representative deployment component.

FIG. 2 is a block diagram depicting a representative deployment component 130. The deployment component 130 includes an analysis component 210 configured to analyze and collect information from an application, or more in other words application code, that will be useful in deploying the application with respect to a particular execution environment. For instance, the analysis component 210 can identify application pieces such as data types, procedures, and functions as well as dependency relationships. Although not limited thereto, programmers can assist the analysis component 210 by providing code annotations, or in other words metadata, that identifies data types, procedures, functions (e.g., scalar value, table value . . . ), and the like. By way of example, a class can be annotated with "[SQL Procedure]" indicating that the class should be exposed as a SQL stored procedure. Similarly, an annotation of "[SQL Data Type]" on a class identifies a new data type.

The deployment component 130 also includes a code generation component 220 configured to generate deployment code that performs requisite actions for making an application available for use as a function of at least information identified by the analysis component 210. More particularly, the code generation component 220 includes an installation component 222, a maintenance component 224, and a removal component 226. The installation component 222 is configured to generate code (e.g., script) for installing an application. Accordingly, the installation code can vary as a function of an application as well as the system on which the code is deployed. For example, the installation code may involve registering program procedures, functions, and/or data types in a prescribed order.

The maintenance component 224 generates code for maintaining an installed application, which can include updating, or upgrading, an installed application. In some situations where execution environments support an update operation, it can be relatively simply to update one or more applications components with new versions of the components. However, in other situations where such a command is not supported, such as database servers, updating can be quite complicated, especially when dealing with a large and complex application comprising a number of files and dependencies between the files or other pieces of code. By way of example, suppose there are three executable and/or non-executable files, "A," "B," and "C," wherein "A"

depends on "B" and "B" depends on "C," and functionality is provided to add and remove files. Accordingly, if "A" is to be updated with a new version, the following series of actions can be performed ensuring that file is not removed that from which another file depends: "Remove C; Remove B; Remove A; Add A.v2 Add B; and Add C." Information about these and more complicated dependencies can be acquired and provided by the analysis component 210.

The removal component 226 is configured to generate code to remove, or in other words uninstall, the application. Similar to the installation component 222 and the maintenance component 224, the removal component 226 can make use of information acquired by the analysis component 210 including but not limited to file dependencies. In particular, code can be generated describing how to un-install installed pieces of code by reversing the order of installation. Here, the order of uninstalling is significant since several applications can share code and inadvertently breaking other applications is not desired. In this manner, an application can be completely un-installed. Additionally or alternatively, such code can be utilized to uninstall a single file for example when updating a file as described with respect to the maintenance component 224. While the un-install code could be generated from the installed files, if one or more of the files are lost, or cannot be found, the complete application cannot be un-installed because the dependencies may not be able to be reconstructed. Accordingly, it is beneficial to generate removal or un-install code upon installation of one or more files.

The deployment component 130 also includes an execution initiation component 230 and an output component 240 each of which provides some functionality with respect to generated deployment code. The execution initiation component 230 is configured to initiate execution of the generated deployment code with respect to an execution engine. However, in some instances that may not be permitted. The output component 240 is configured to output generated deployment code to an authorized entity (e.g., database administrator (DBA)), which can analyze the deployment and if approved, or in other words deemed acceptable, initiate execution.

Figure 3:
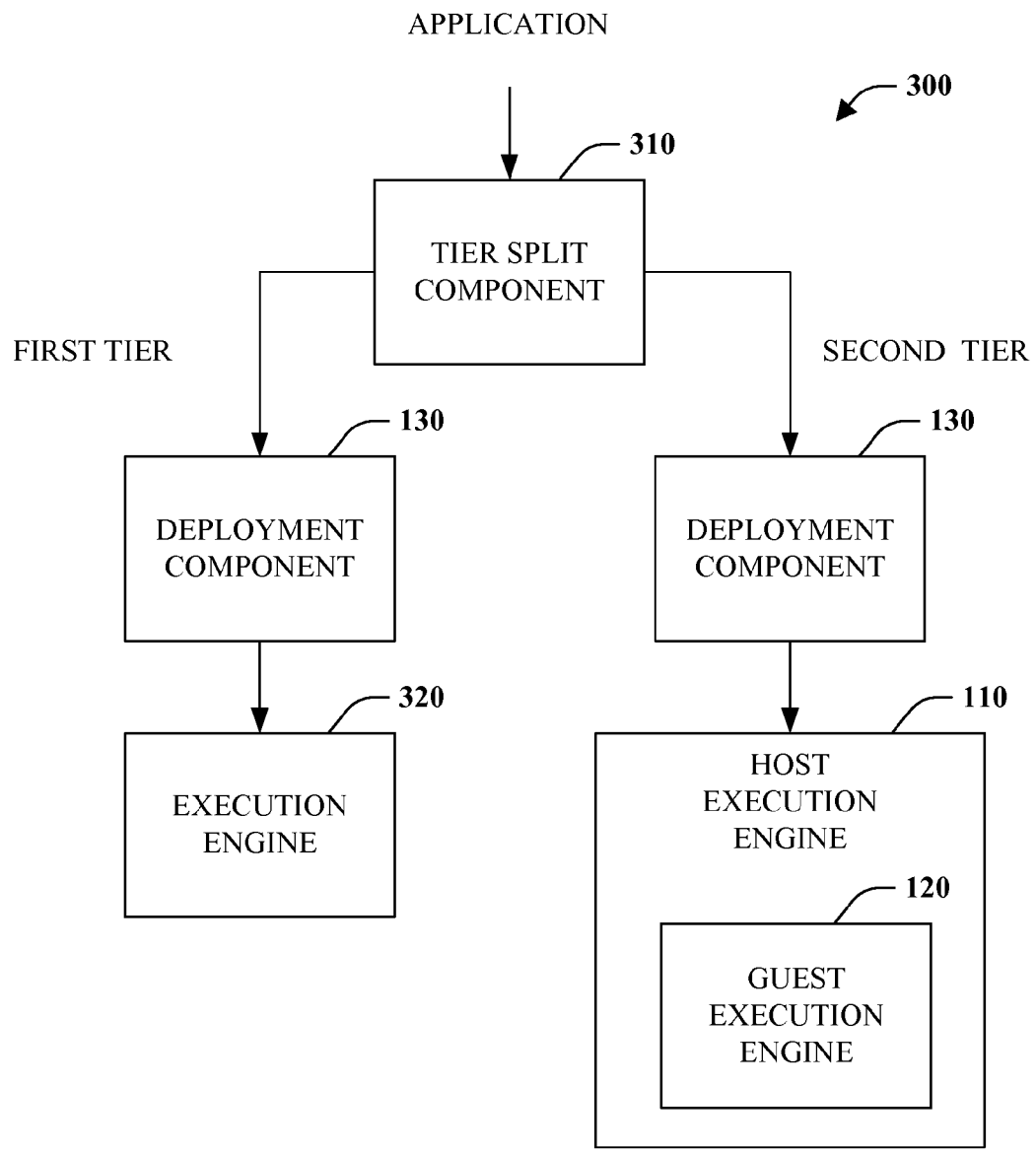
FIG. 3 is a block diagram of a system that facilitated distributed programming.

FIG. 3 illustrates a system 300 that facilitates distributed processing. The system includes a tier-split component 310 that is configured to automatically or semi-automatically generate a multi-tier application from a single tier application. The resulting application can thus operate completely on one of multiple tiers or be separated for coordinated execution across the multiple tiers. The decision regarding how and where an application will execute can be made by the tier-split component 310 based on contextual information including but not limited to central processor load/availability, network bandwidth/latency, projected communication costs across tiers, historical data, and/or specified policies. As shown, here all or a portion of an application can be provided with respect to two tiers. In the first tier, the application can execute with respect to the execution engine 320. In the second tier, the application can be executed with respect to the guest execution engine 120 hosted by the host execution engine 110.

Once the tier split component 310 generates code for either or both of the tiers, the deployment component 130 can be employed to facilitate deploying the application. With respect to the first tier, deployment can comprise copying the code to the execution engine 320. However, as per the second tier, deployment can be much more complicated since the guest execution engine 120 is embedded in the host execution engine 110. For safety, security, and/or implementation reasons, the host execution can mandate a particular deployment protocol include explicit registration of pieces of code. As previously described, the deployment component 130 can analyze and acquire information from an application to be deployed and automatically generate code to deploy the application. In accordance with one embodiment, the execution engine 320 and the guest execution engine 120 can be similar or the same, one difference being that the guest execution engine 120 is hosted by the host execution engine 110.

Figure 4:
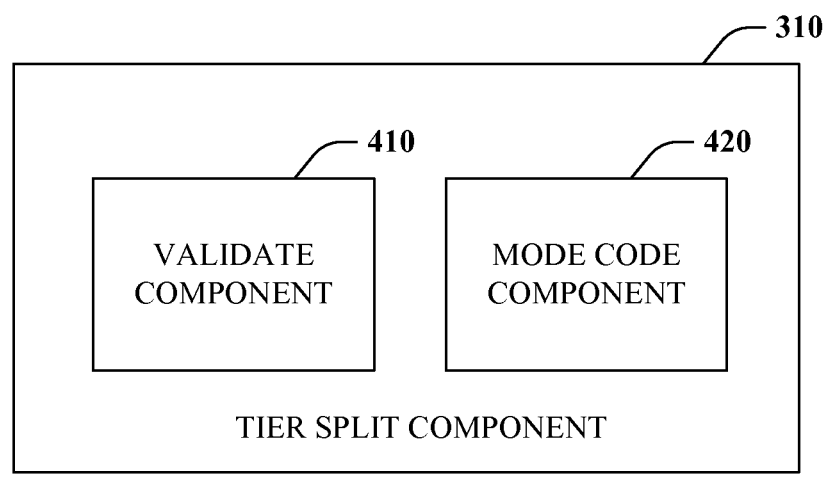
FIG. 4 is a block diagram of a representative tier split component.

FIG. 4 illustrates a representative tier split component 310 in accordance with an aspect of the disclosure. In some circumstances, various code security modes can be supported to control interaction by a guest execution environment, for example, to facilitate safe and/or secure execution. For example, in a first mode, "full trust," all code can be allowed to run, in a second mode, "restricted," some code may not be allowed to run and in a third mode, "secure," still further code may not be allowed to run. In addition to providing functionality previously discussed, the tier split component 310 can be extended to deal with these security modes. In particular, the tier split component 310 can include a validate component 410 and a mode code component 420.

The validate component 410 is configured to validate that application code can be fully deployed and execute properly in view of a specific mode. For example, where application code is going to be deployed in an execution environment with at least some restrictions, the validate component 410 can analyze the code and determine whether the code can be deployed and executed correctly. If, for instance, a function is called that not available in a specific mode, the validate component 410 can generate an error message indicating as much. Otherwise, the code can be validated with or without a corresponding message.

The mode code component 420 can generate code appropriate for various modes. More specifically, the mode code component 420 can produce equivalent code that is valid in a particular security mode. For instance, calls or operations that are not allowed can be replaced by a semantically equivalent set of one or more calls or operations that are allowed. Furthermore, such code can involve generation and utilization of code on multiple tiers to enable return of the same results in a different way. By way of example, suppose execution is within the context of a database and the security mode does not allow a particular operation. Here, the mode code component 420 can generate code that rather than invoking a disallowed operation employs an allowed operation to create a local database including information about what operation needs to be performed and where the result is to be placed, for example. On another tier, outside the database (e.g., out-of-process), the local database can be read, an appropriate operation can be performed, and the results returned to a designated location. Back inside the database (e.g., in process), the code can read the returned results. In other words, a temporary database is utilized as a proxy to allow a disallowed operation to be performed outside and results returned. Furthermore, where multiple versions of application code are produced for corresponding security modes, the deployment component 130 can determine and deploy valid code for a particular security mode.

Figure 5:
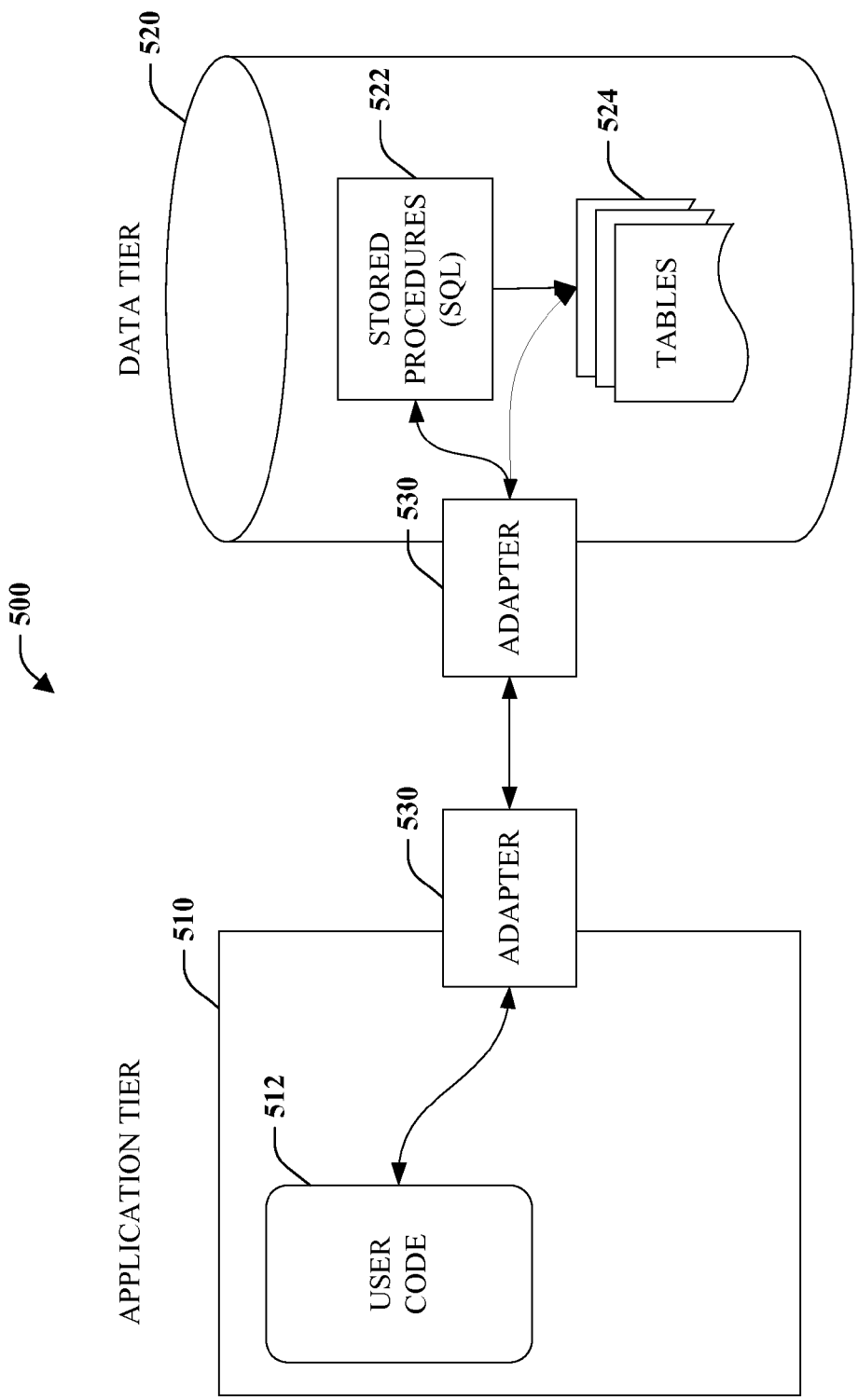
FIG. 5 is a block diagram of a conventional two-tier architecture including an application tier and a data tier.
Figure 6:
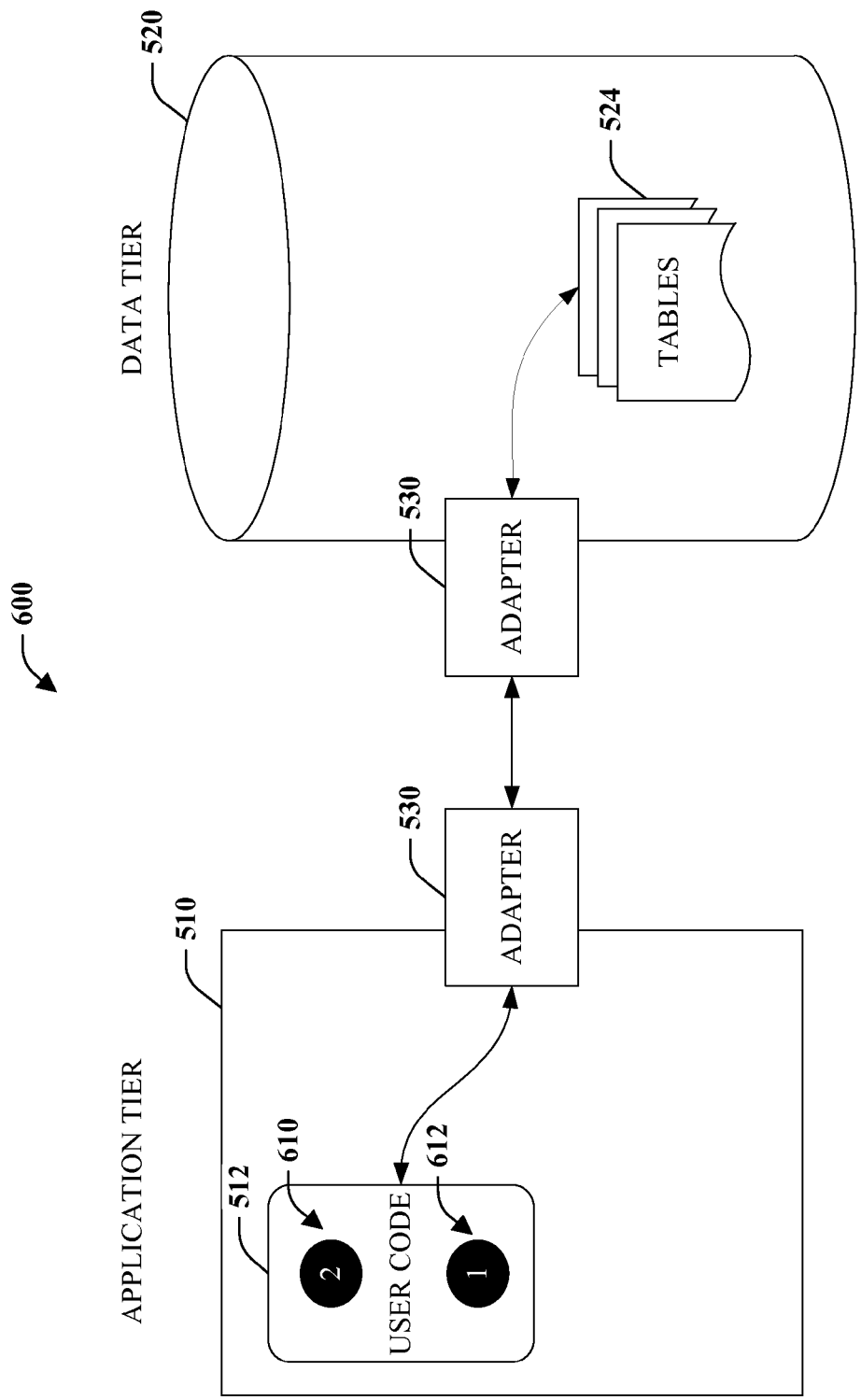
FIG. 6 is a block diagram of an exemplary two-tier architecture including an application tier and a data tier.
Figure 7:
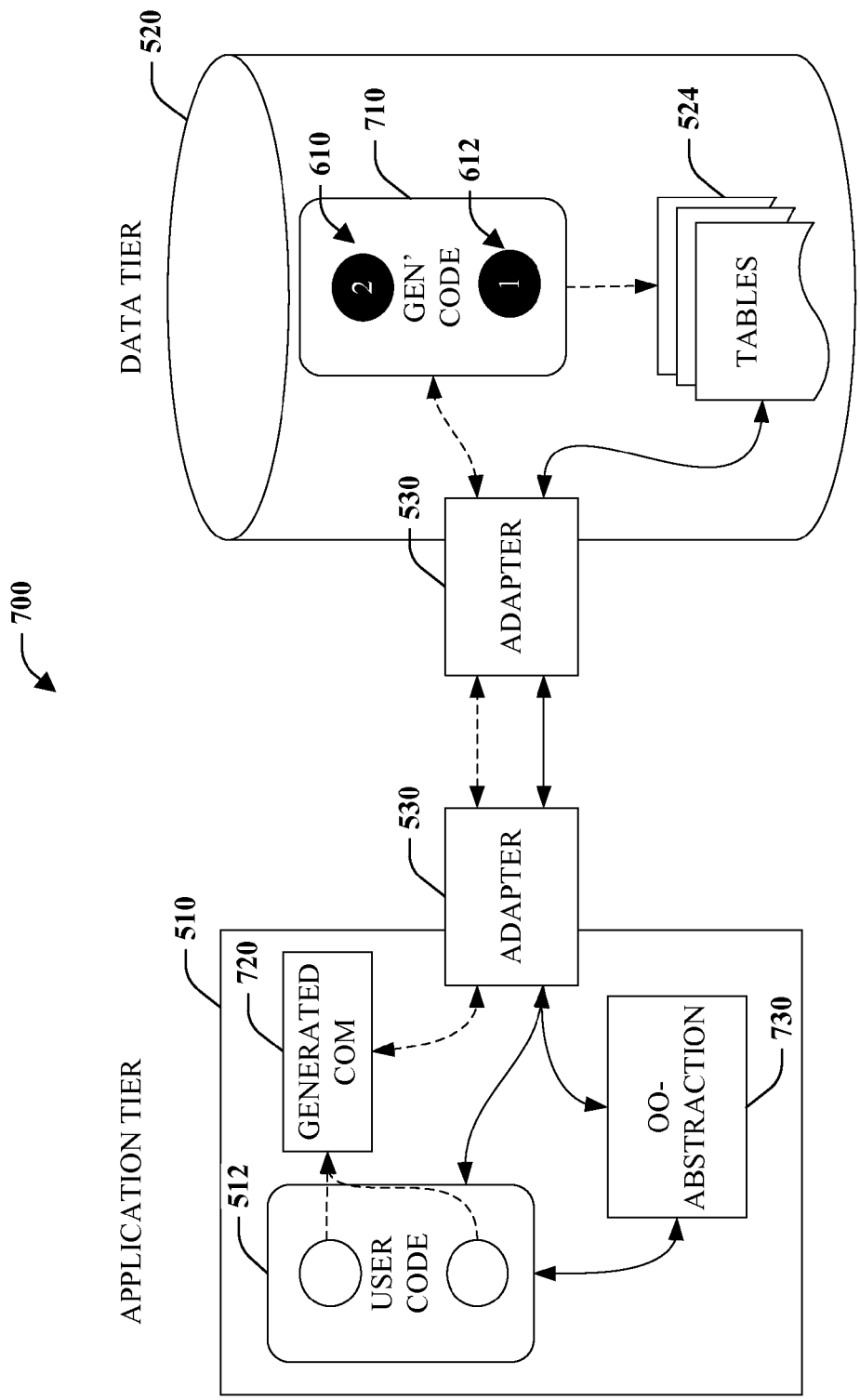
FIG. 7 is a block diagram of an exemplary distributed processing system an application tier and a data tier.

FIGS. 5-7 illustrate exemplary scenarios to facilitate clarity and understanding with respect to some aspects of the claimed subject matter. These figures describe aspects in the context of a two-tier system including an application tier 510 and a data tier 520 (e.g., data server). Of course, FIGS. 5-7 and related description are not intended to restrict claimed aspects in any way but rather are merely exemplary.

FIG. 5 illustrates a conventional two-tier system 500 including the application tier 510 and the data tier 520. An adapter 530 can be utilized to enable communication between the application tier 510 and the data tier 520. Here, user code 512, by way of the adapter 530, can make calls to the stored procedures 522 (e.g., a group of transact-SQL statements compiled into a single execution plan) that interact with one or more tables 524 housing data. Additionally or alternatively, the user code 512 can simply interact directly with the tables 524 through the adapter 530. Results of any query or other data manipulation operations performed directly or indirectly on the tables 524 can be returned back to the user code 512, vis-à-vis the adapter 530, for further use.

FIG. 6 depicts a two-tier architecture 600 including the application tier 510 and data tier 520. Similarly, the adapter 530 can enable communication between the application tier 510 and the data tier 520. Here, the user code 512 can perform query or other data manipulation operations (e.g., create new table, delete table . . . ) directly on the one or more tables 524. Moreover, pieces of the user code or fragments 610 and 612 can be designated for execution in the database for example with a code annotation "Run in Database."

FIG. 7 illustrates a distributed processing 700 that results from a tier split with respect to the user code 512 and subsequent deployment with respect to the data tier 520. More specifically generated code 710 is deployed including code fragments 610 and 612 that previously formed part of the user code 512 on the application tier 510. In addition, generated communication 720 can be produced and deployed on the application tier 510 to enable communication between the user code 512 and the generated code 710. Furthermore, object-oriented abstraction component 730 can be deployed to abstract or map between untyped coding and a more strongly typed version. For example, the untyped coding of "string name=(string) record["Name"]" and "int age=(int) record ["Age"]" can be mapped into more strongly typed versions such as "string name=record.Name" and "int age=record.Age," respectively. In other words, it does not matter whether an application uses object-oriented mapping of records or untyped objects.

Here, the data tier 520 can support a database, or more particularly a relational, execution environment that receives structured query language (SQL) queries or the like and returns results. Furthermore, the data tier 520 can include a guest execution environment for executing code against the one or more tables 524 utilizing another programming language. The user generated code 710 can run in the guest execution environment and execute operations with respect to the one or more local tables 524 much faster than if the same operations where performed from the application tier 510 due to bandwidth and/or network latency issues among other things. However, the same operations can be performed solely on the application tier 510, solely on the data tier 520 or some combination of the two tiers. In other words, the operations can be performed in-process or out-of-process with respect to the tables 524. The manner in which application code is distributed can vary based on a plurality of factors relating to both the application tier and the data tier. For example, moving operations to the data tier 520 can result faster computation than out-of process operations. However, this might not be the best solution since it may interfere with operations by other users. Accordingly, maybe a job can be performed at night and finish within a half hour as opposed to being performed out-of-process during the day and finishing within two hours.

Furthermore, it should be appreciated that such a combination of a database execution environment and another execution environment that supports one or more program language applications of various types (e.g., object-oriented, procedural, functional . . . hybrid) provides great advantages with respect to efficient processing of data, among other things. However, this is also a situation where an overly burdensome deployment protocol can be employed including mandating copying and registration of code in a particular order as well as utilization of a plurality of security modes. For the most part such protocol is employed to safeguard the one or more tables 524 and/or database operations from potentially unsafe and/or unsecure actions of hosted code. As described herein, a deployment component 130 and associated functionality can be employed to automatically generate code for deployment and relieve programmers of this burden.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the deployment component 130 can utilize such mechanisms in analyzing and application to determine or infer information useful in deploying an application.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 8:
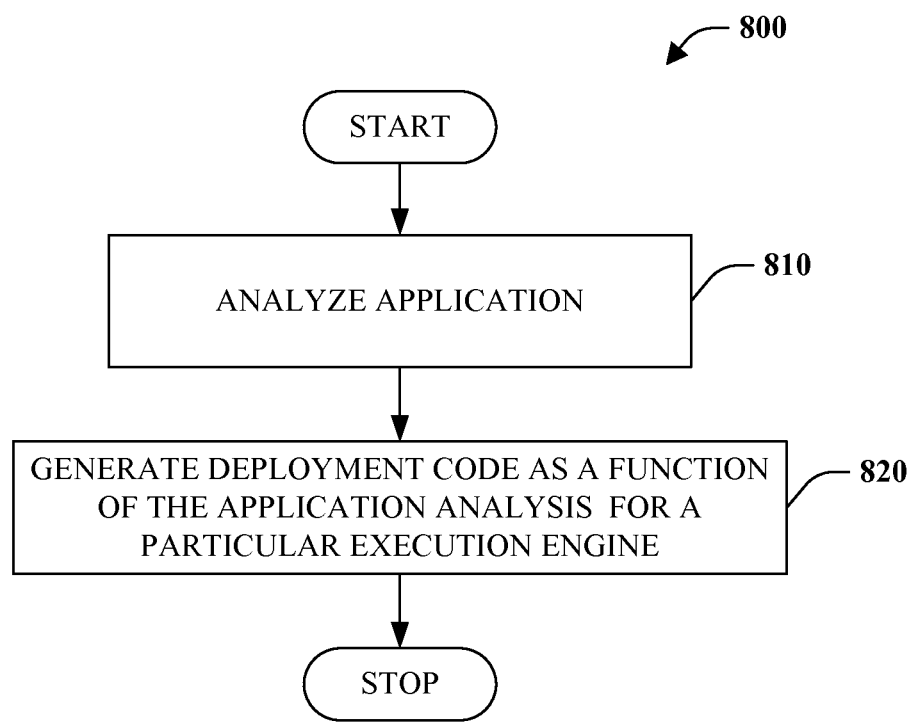
FIG. 8 is a flow chart diagram of a method of application deployment.

Referring to FIG. 8, a method of application deployment 800 is illustrated. At reference numeral 810, an application or more specifically application code can be analyzed to identify information pertinent to deployment including code dependencies across one or more applications, among other things. In accordance with one embodiment, code annotations specified by a programmer providing application metadata can be utilized in the analysis. At numeral 820, deployment code can be created as a function of the application analysis and a particular execution engine. Such deployment code can pertain to installation, maintenance (e.g., update/upgrade), and un-installation of code. In accordance with one embodiment the generated deployment code can be provided to an authorized entity to analyze, approve, and initiate execution thereof.

Figure 9:
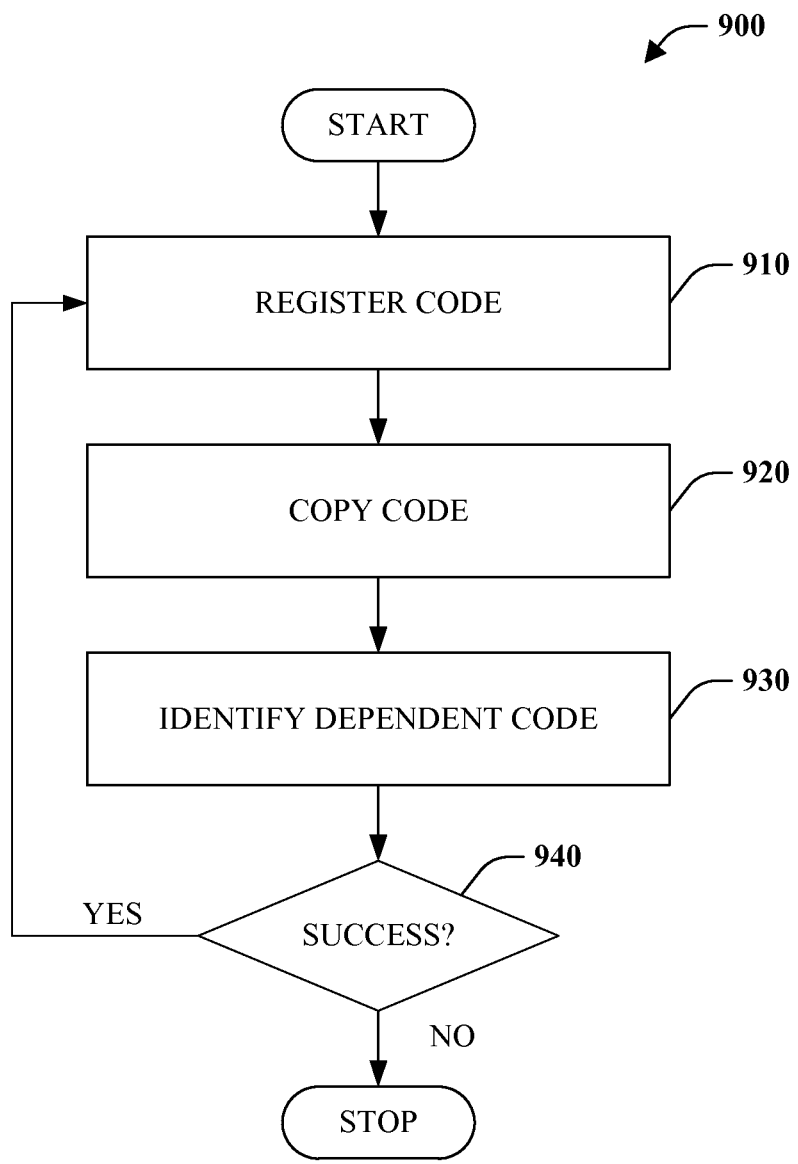
FIG. 9 is a flow chart diagram of a method of installing code.

FIG. 9 depicts a method of installing code 900. At reference numeral 910, application code or a portion thereof is registered with an execution environment, for example. At reference numeral 920, the registered code is copied to the execution environment. At 930, dependent code is located. For example, if "A" is registered, installed, and "B" depends on "A," then "B" is identified. At numeral 940, a check is made as to whether the act of identifying dependent code was successful. If, at 930, dependent code could not be identified ("NO"), the method terminates. Otherwise, if dependent code is identified, at 930, ("YES"), the method 900 loops back to reference numeral 910 where the code is registered.

Figure 10:
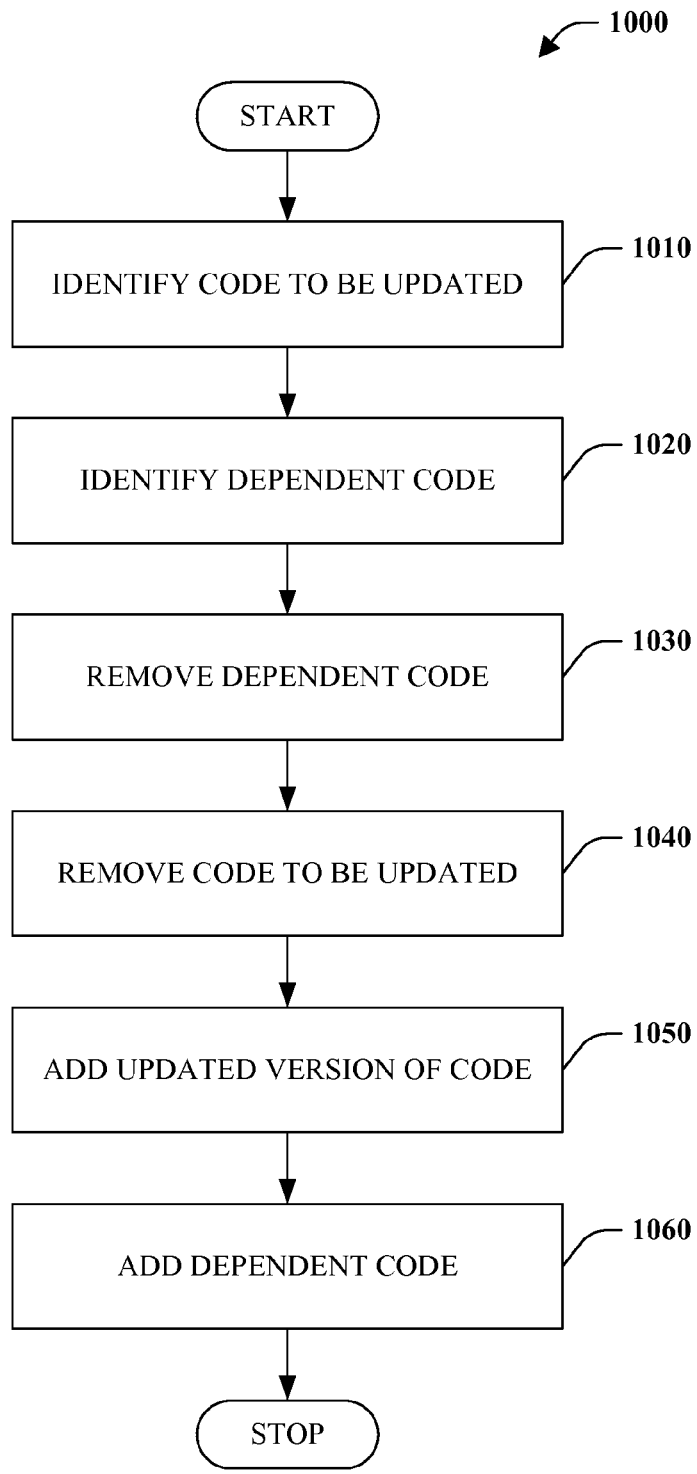
FIG. 10 is a flow chart diagram of a method of updating code.

FIG. 10 illustrates a method of updating/upgrading code 1000. At reference numeral 1010, code to be updated/upgraded is identified. For example, the code can correspond to a file including executable or non-executable code. At numeral 1020, code that depends from the code to be updated is identified. At 1030, the identified dependent code is removed. The code to be updated/upgraded is then removed at numeral 1040. At reference numeral 1050, the updated/upgraded version of the code is added. At 1060, the dependent code is added.

Figure 11:
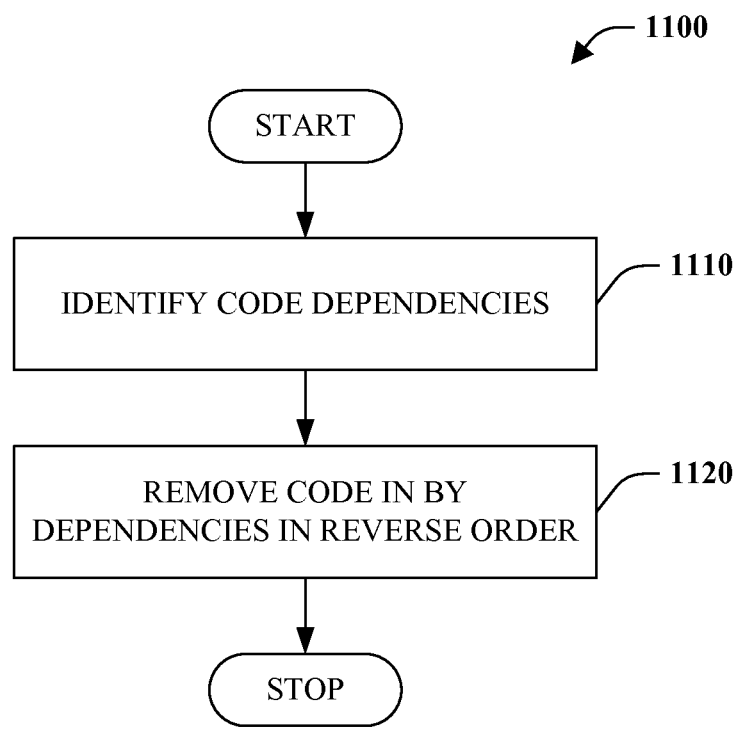
FIG. 11 is a flow chart diagram of a method of un-installing code.

FIG. 11 is a flow chart diagram of a method of un-installing an application 1100. At numeral 1110, dependencies between code portions are identified. For example, such dependences can be determined and provided prior to application installation. At reference numeral 1120, code is removed based on dependencies in reverse order. For example, if "A" depends on "B" which depends on "C," "C" is removed first followed by "B" and then "A."

Throughout this detailed description, discussion has focused on application and data tiers and application deployment with respect to data tier. Note, however, that the claimed subject matter is not limited thereto. Aspects of the claimed subject matter are beneficial in many other situations. By of example and not limitation a similar situation can exist with respect to plugins that run in a browser. For example, multiple plugins can exist with various dependencies that can benefit from automatic deployment functionality as described herein.

As used herein, the terms "component," "system," and "engine" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 12:
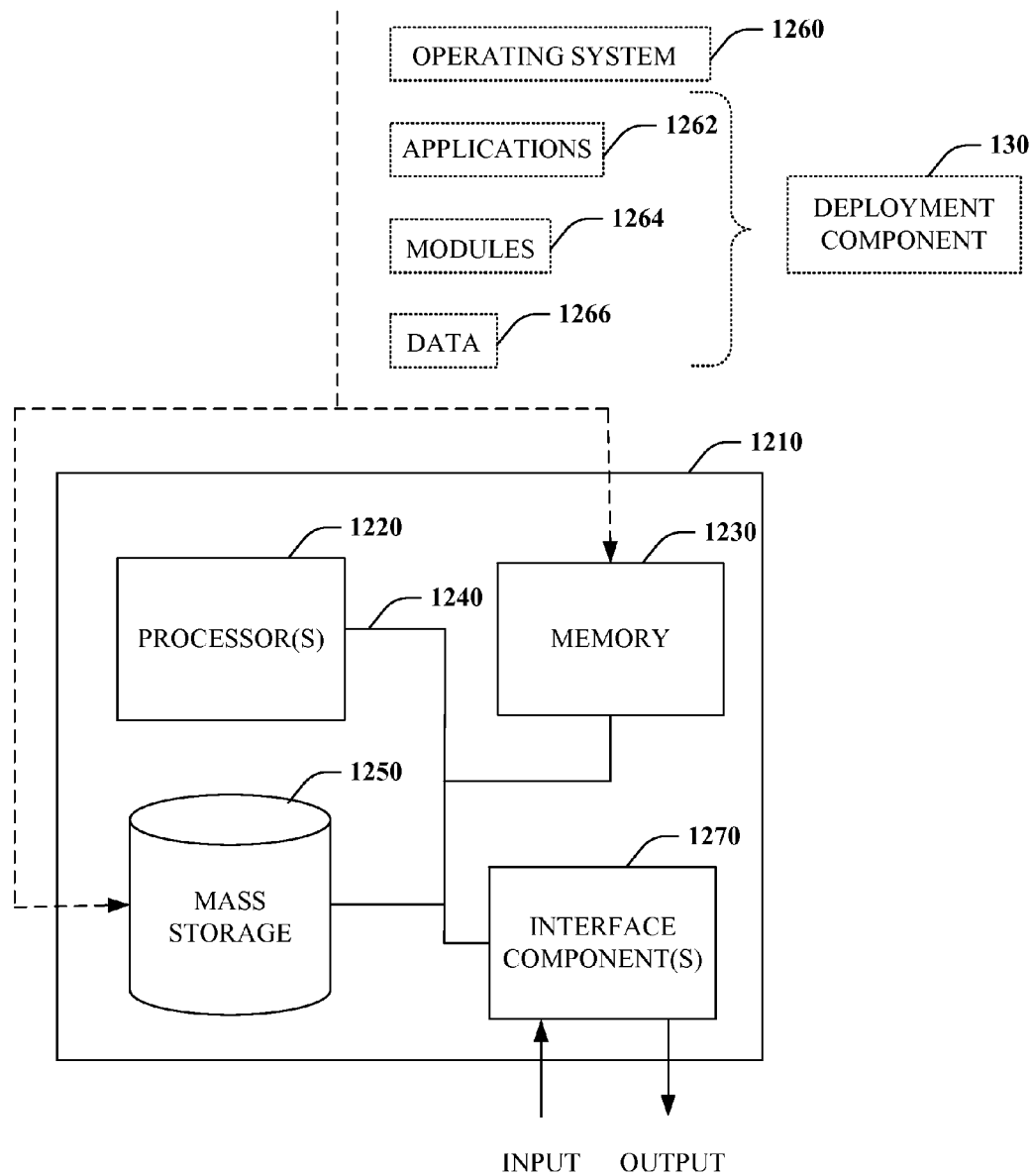
FIG. 12 is a schematic block diagram illustrating a suitable operating environment for aspects of the subject disclosure.

In order to provide a context for the claimed subject matter, FIG. 12 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 12, illustrated is an example general-purpose computer 1210 or computing device (e.g., desktop, laptop, server, hand-held, programmable consumer or industrial electronics, set-top box, game system . . . ). The computer 1210 includes one or more processor(s) 1220, memory 1230, system bus 1240, mass storage 1250, and one or more interface components 1270. The system bus 1240 communicatively couples at least the above system components. However, it is to be appreciated that in its simplest form the computer 1210 can include one or more processors 1220 coupled to memory 1230 that execute various computer executable actions, instructions, and or components stored in memory 1230.

The processor(s) 1220 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1220 may also be implemented as a combination of computing devices, for example a combination of a DSP and a microprocessor, a plurality of microprocessors, multi-core processors, one or more microprocessors in conjunction with a DSP core, or any other such configuration.

The computer 1210 can include or otherwise interact with a variety of computer-readable media to facilitate control of the computer 1210 to implement one or more aspects of the claimed subject matter. The computer-readable media can be any available media that can be accessed by the computer 1210 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1210.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1230 and mass storage 1250 are examples of computer-readable storage media. Depending on the exact configuration and type of computing device, memory 1230 may be volatile (e.g., RAM), non-volatile (e.g., ROM, flash memory . . . ) or some combination of the two. By way of example, the basic input/output system (BIOS), including basic routines to transfer information between elements within the computer 1210, such as during start-up, can be stored in nonvolatile memory, while volatile memory can act as external cache memory to facilitate processing by the processor(s) 1220, among other things.

Mass storage 1250 includes removable/non-removable, volatile/non-volatile computer storage media for storage of large amounts of data relative to the memory 1230. For example, mass storage 1250 includes, but is not limited to, one or more devices such as a magnetic or optical disk drive, floppy disk drive, flash memory, solid-state drive, or memory stick.

Memory 1230 and mass storage 1250 can include, or have stored therein, operating system 1260, one or more applications 1262, one or more program modules 1264, and data 1266. The operating system 1260 acts to control and allocate resources of the computer 1210. Applications 1262 include one or both of system and application software and can exploit management of resources by the operating system 1260 through program modules 1264 and data 1266 stored in memory 1230 and/or mass storage 1250 to perform one or more actions. Accordingly, applications 1262 can turn a general-purpose computer 1210 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the deployment component 130, or portions thereof, can be, or form part, of an application 1262, and include one or more modules 1264 and data 1266 stored in memory and/or mass storage 1250 whose functionality can be realized when executed by one or more processor(s) 1220.

In accordance with one particular embodiment, the processor(s) 1220 can correspond to a system on a chip (SOC) or like architecture including, or in other words integrating, both hardware and software on a single integrated circuit substrate. Here, the processor(s) 1220 can include one or more processors as well as memory at least similar to processor(s) 1220 and memory 1230, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the deployment component 130 and/or associated functionality can be embedded within hardware in a SOC architecture.

The computer 1210 also includes one or more interface components 1270 that are communicatively coupled to the system bus 1240 and facilitate interaction with the computer 1210. By way of example, the interface component 1270 can be a port (e.g., serial, parallel, PCMCIA, USB, FireWire . . . ) or an interface card (e.g., sound, video . . . ) or the like. In one example implementation, the interface component 1270 can be embodied as a user input/output interface to enable a user to enter commands and information into the computer 1210 through one or more input devices (e.g., pointing device such as a mouse, trackball, stylus, touch pad, keyboard, microphone, joystick, game pad, satellite dish, scanner, camera, other computer . . . ). In another example implementation, the interface component 1270 can be embodied as an output peripheral interface to supply output to displays (e.g., CRT, LCD, plasma . . . ), speakers, printers, and/or other computers, among other things. Still further yet, the interface component 1270 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of application deployment, comprising:
    employing at least one processor configured to execute computer-executable instructions stored in memory to perform the following acts:
    receiving a deployment protocol associated with a host execution environment that controls installation of applications on a guest execution environment embedded within the host execution environment of a computer;
    analyzing a computer application to identify pieces of code and dependency relationships; and
    generating deployment code automatically for at least a portion of an application with respect to deploying the application in the guest execution environment based on information acquired about the application from the analyzing act and the deployment protocol, wherein the deployment code is executable by the host execution environment to install the application in the guest execution environment.

2. The method of claim 1 further comprises generating deployment code that registers a piece of the application and one or more dependent pieces of the application with the host execution environment.

3. The method of claim 1 further comprises generating maintenance code for the application as a function of the information acquired about the application from the analyzing act.

4. The method of claim 3 further comprises storing the maintenance code in a store maintained by the host execution environment.

5. The method of claim 1 further comprises generating un-install code for the application as a function of the information acquired about the application from the analyzing act.

6. The method of claim 5 further comprises storing the un-install code in a store maintained by the host execution environment.

7. The method of claim 1 further comprises generating deployment code valid for a security mode of the host execution environment, wherein the security mode is configured to control interaction with the guest execution environment.

8. The method of claim 1 further comprises initiating execution of the deployment code within the host execution environment.

9. A system that facilitates application deployment, comprising:
    a processor coupled to a memory, the processor configured to execute computer-executable instructions stored in the memory, which, when executed, perform the following acts:
    acquire information about an application to be deployed, the information includes pieces of code and dependency relationships; and
    automatically generate deployment code for the application, executable by a guest execution engine, based on the information about the application and a deployment protocol of a host execution engine that hosts the guest execution engine, wherein the deployment code is executable by the host execution engine to install the application on the guest execution engine of a computer, and the guest execution engine is embedded within the host execution engine.

10. The system of claim 9, the acts further comprise generate maintenance code automatically as a function of the information about the application and a maintenance protocol of the host execution engine.

11. The system of claim 10 the maintenance code is stored in a store managed by the host execution engine.

12. The system of claim 9, the acts further comprise generate un-install code automatically as a function of the information about the application and an un-install protocol of the host execution engine.

13. The system of claim 12, the un-install code is stored in a store managed by the host execution engine.

14. The system of claim 9, the acts further comprise generate deployment code valid for a security mode of the host execution engine, wherein the security mode controls interaction with the guest execution engine through the host execution engine.

15. The system of claim 9, the host execution engine is a relational database engine.

16. The system of claim 9, the guest execution engine is a runtime environment targeted by multiple programming languages.

17. A computer-readable storage medium having instructions stored thereon that enable at least one processor to perform a method upon execution of the instructions, the method comprising:
    analyzing an application or portion thereof, destined for execution by a guest execution engine embedded within a host execution engine, identifying pieces of code and dependency relationships; and
    generating deployment code for the application automatically as a function of the analyzing act and a deployment protocol of the host execution engine, wherein the deployment code is executable by the host execution engine, and the application is installed on the guest execution engine after the deployment code is executed by the host execution engine.

18. The computer-readable storage medium of claim 17, the method further comprises generating maintenance code as a function of the application and a maintenance protocol of the host execution engine.

19. The computer-readable storage medium of claim 17, the method further comprises generating un-install code as a function of the application and an un-install protocol of the host execution engine.

20. The computer-readable storage medium of claim 17, the method further comprising initiating execution of the deployment code with respect to the host execution engine.

* * * * *